(12) United States Patent
Trentin et al.

(10) Patent No.: US 9,409,470 B2
(45) Date of Patent: Aug. 9, 2016

(54) ARRANGEMENT PROVIDED WITH A MECHANISM FOR HOLDING AN ENERGY STORAGE DEVICE, AND ASSOCIATED VEHICLE

(71) Applicant: RENAULT s.a.s., Boulogne-Billancourt (FR)

(72) Inventors: Stephane Trentin, Viry-Chatillon (FR); Gilles Mulato, Chatillon (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/425,212

(22) PCT Filed: Jul. 31, 2013

(86) PCT No.: PCT/FR2013/051850
§ 371 (c)(1),
(2) Date: Mar. 2, 2015

(87) PCT Pub. No.: WO2014/033384
PCT Pub. Date: Mar. 6, 2014

(65) Prior Publication Data
US 2015/0231956 A1    Aug. 20, 2015

(30) Foreign Application Priority Data
Aug. 30, 2012    (FR) ..................................... 12 58101

(51) Int. Cl.
*B60K 1/04*    (2006.01)
(52) U.S. Cl.
CPC ........... *B60K 1/04* (2013.01); *B60K 2001/0438* (2013.01); *B60K 2001/0472* (2013.01)

(58) Field of Classification Search
CPC ............. B60K 1/04; B60K 2001/0438; B60K 2001/0472; B60K 2001/0494
USPC ......................................................... 180/68.5
See application file for complete search history.

(56) References Cited

U.S. PATENT DOCUMENTS 5,555,950 A * 9/1996 Harada ............... H01M 2/1083
180/232
7,066,531 B2 * 6/2006 Tomita ................. B62D 25/082
180/68.5

(Continued)

FOREIGN PATENT DOCUMENTS

DE    10 2010 006 514    9/2010
WO    2012 035987        3/2012

OTHER PUBLICATIONS

French Search Report Issued Apr. 16, 2013 in French Priority Application No. 1258101 Filed Aug. 30, 2012.

(Continued)

*Primary Examiner* — John Walters
*Assistant Examiner* — Brian Swenson
(74) *Attorney, Agent, or Firm* — Oblon, McClelland, Maier & Neustadt, L.L.P.

(57) ABSTRACT

An arrangement for a motor vehicle including a mechanism for holding an energy storage device, and associated vehicle. The arrangement includes a chassis, an electrical energy storage device, a fixing device for fixing the energy storage device to the chassis of the vehicle, a holding mechanism configured to switch, in case of a breakage of at least a portion of the fixing device, from a passive configuration in which it does not support the energy storage device to an active configuration in which it supports the energy storage device in such a way to hold the energy storage device close to the chassis.

20 Claims, 2 Drawing Sheets

(56) References Cited

U.S. PATENT DOCUMENTS

| | | | | |
|---|---|---|---|---|
| 7,070,015 B2 * | 7/2006 | Mathews | ............... | B60K 1/04 180/274 |
| 7,983,033 B2 * | 7/2011 | Antonuccio | ......... | G11B 33/124 312/223.2 |
| 8,276,698 B2 * | 10/2012 | Guss | ............... | B60K 1/04 180/65.1 |
| 2012/0111654 A1 * | 5/2012 | Origuchi | ............... | B60K 1/04 180/68.5 |
| 2013/0161106 A1 | 6/2013 | Iwai et al. | | |

OTHER PUBLICATIONS

International Search Report Issued Oct. 2, 2013 in PCT/FR13/051850 Filed Jul. 31, 2013.

* cited by examiner

ARRANGEMENT PROVIDED WITH A MECHANISM FOR HOLDING AN ENERGY STORAGE DEVICE, AND ASSOCIATED VEHICLE

TECHNICAL FIELD OF THE INVENTION

The invention concerns the field of motor vehicles.

The object of the invention is more particularly an arrangement for a motor vehicle comprising a chassis, an electrical energy storage device, and a device for fixing the energy storage device to the chassis of the vehicle.

PRIOR ART

The development of vehicles with fully electric propulsion, or hybrid vehicles with electric motor and internal combustion engine, is growing rapidly, in particular thanks to the design of new high-performance battery technologies to ensure the mobility of the vehicle.

When a propulsion battery is used, it is preferable for this to be easily exchanged and accessible from the outside of the vehicle. For this, the propulsion battery is preferably fixed to the chassis below the vehicle.

Like all motor vehicles, the fully electric or hybrid propulsion vehicle is liable to be damaged on impact for example with another vehicle. For safety reasons, it is preferable for the battery to remain attached to the vehicle. To achieve this, the vehicles currently available on the market multiply the battery fixing points on the chassis in order to reduce the probability of detachment of all fixing points.

However, although the probability of detachment is reduced, in the case of severe impact in particular from the side, the fixings will all tend to break because of the shear force induced by the impact. The result is separation of the battery from the rest of the vehicle.

OBJECT OF THE INVENTION

The aim of the present invention is to propose a solution for securing an electrical energy storage device for a motor vehicle.

This object is achieved in particular in that the arrangement comprises a holding mechanism configured so as to transfer, in the case of breakage of at least part of the fixing device, from a passive configuration in which it does not support the energy storage device, to an active configuration in which it supports the energy storage device so as to hold it close to the chassis.

For example, the transfer from the passive configuration to the active configuration takes place on a falling movement of the energy storage device.

According to one embodiment, the holding mechanism comprises a connecting element mounted on the chassis, and a holding element mounted on the connecting element, said connecting element passing through a cavity, for example a through hole, of the energy storage device such that at least part of the energy storage device is arranged between the chassis and the holding element.

Advantageously, the holding element is a washer, in particular of dimensions preventing its passage through the cavity.

Also the connecting element may comprise a plate which is mounted on the chassis and from which an elongated body of the connecting element extends, said elongated body passing through the cavity of the energy storage device.

Advantageously, the holding element is mounted on the elongated body at an end opposite the plate, in particular by a bolt screwed into the elongated body and forcing the holding element against said elongated body.

Preferably, the energy storage device comprises a propulsion battery for the motor vehicle.

The arrangement may comprise at least two holding mechanisms.

According to a particular embodiment, the breakage of at least part of the fixing device occurs during a frontal, rear or lateral impact imposed on the vehicle, in particular by shearing of a fixing element of the fixing device.

The invention also relates to a motor vehicle comprising an arrangement as described.

In the vehicle, the arrangement may be configured such that the energy storage device is accessible from the outside and the underside of the vehicle.

BRIEF DESCRIPTION OF THE DRAWINGS

Further advantages and characteristics will arise more clearly from the description below of particular embodiments of the invention, given as non-limitative examples and shown on the attached drawings in which.

DESCRIPTION OF PREFERRED EMBODIMENTS OF THE INVENTION

The arrangement described below differs from the prior art in particular in that it comprises at least one additional holding mechanism, configured so as to hold the energy storage device in particular in the case of its falling towards the ground.

Figure 1:
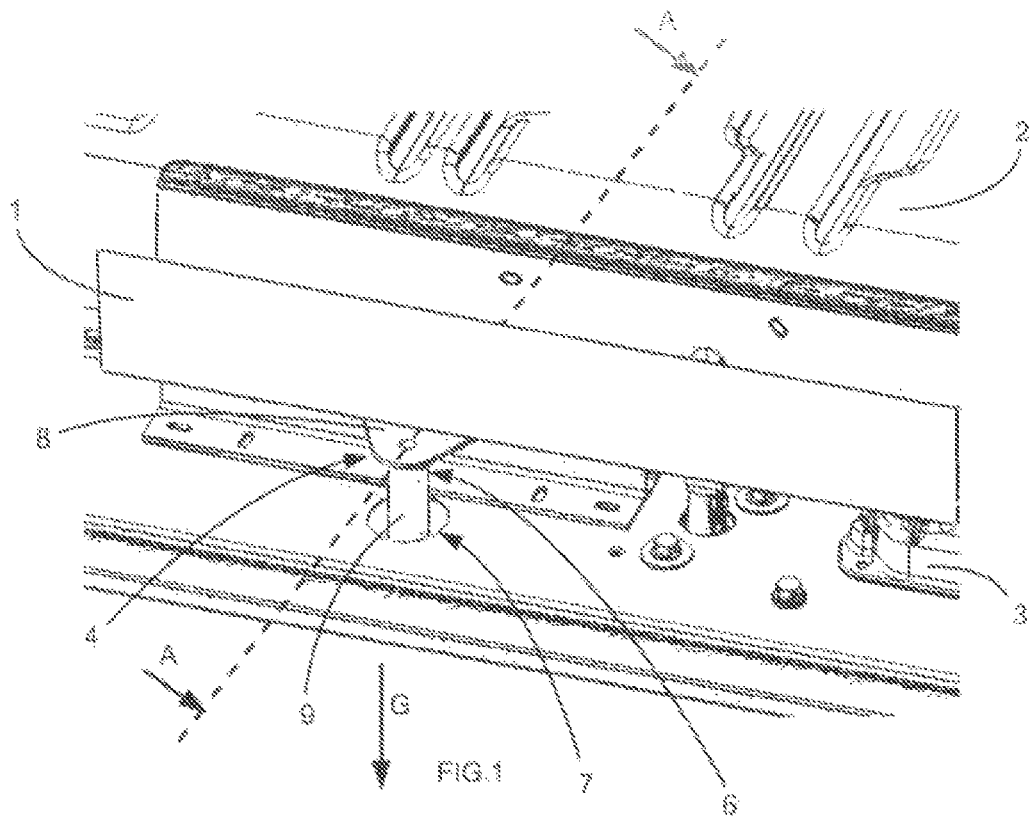
FIG. 1 is a perspective view of an exemplary embodiment of the invention.
Figure 2:
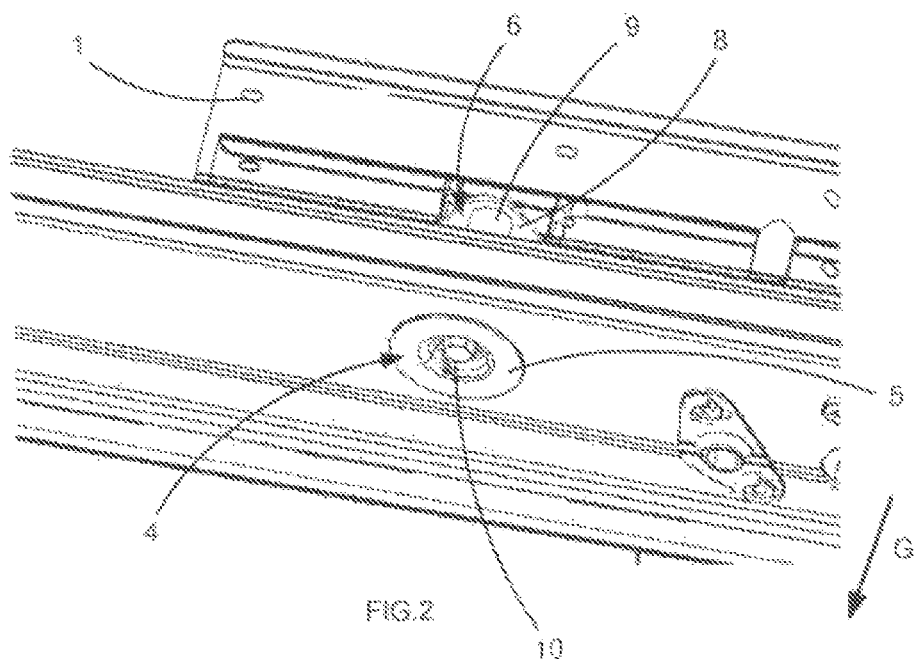
FIG. 2 is a view of FIG. 1 from another perspective.
Figure 3:
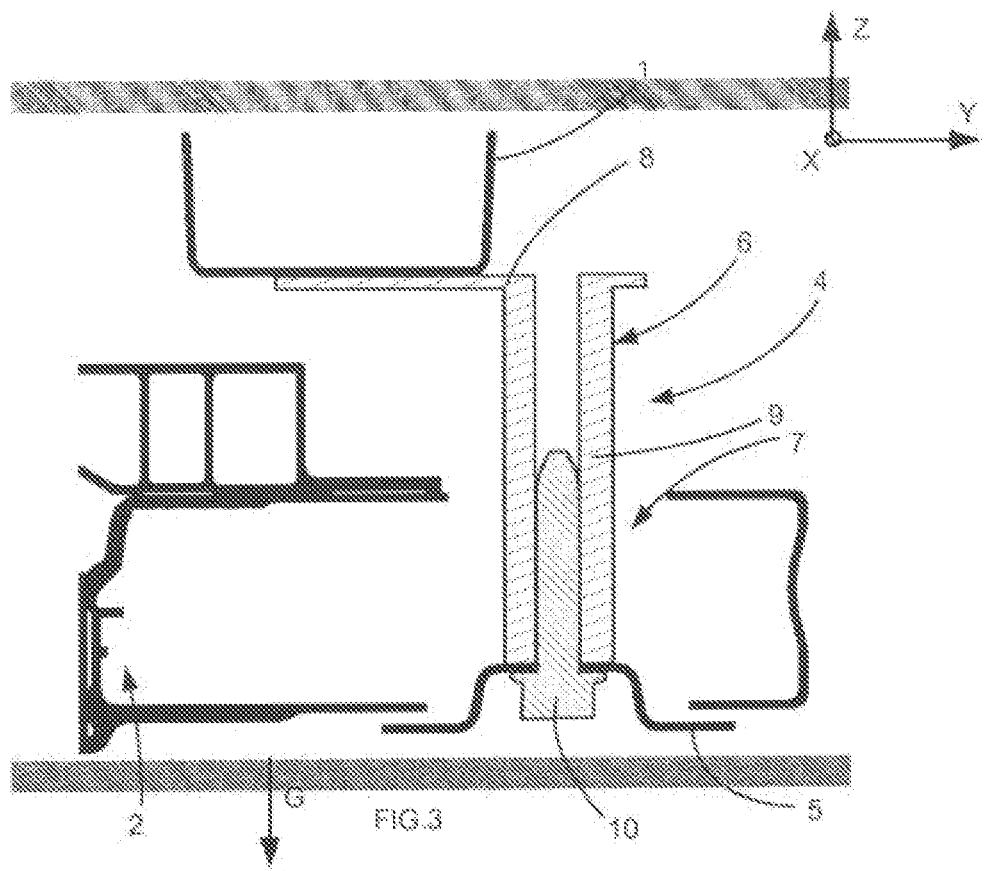
FIG. 3 is a view along section A-A of FIG. 1.

On FIGS. 1 to 3, the arrangement for a motor vehicle comprises a chassis 1, an electrical energy storage device 2, and a device 3 for fixing the energy storage device 2 to the chassis 1 of the vehicle.

The arrangement furthermore comprises a holding mechanism 4 configured so as to transfer, in the case of breakage of at least part of the fixing device 3, from a passive configuration in which it does not support the energy storage device 2, to an active configuration in which it supports the energy storage device 2 so as to hold it close to the chassis 1. In other words, the holding mechanism 4 may act to assist the fixing device 3. The term "close to" here means for example that the energy storage device 2 may be held relative to the chassis 1 thanks to the holding mechanism 4 in its active configuration.

The chassis 1 of the vehicle is a rigid structure on which all constituent elements of a vehicle are mounted. The term "mounted on or at" does not necessarily imply direct mounting, i.e. bringing two mounted pieces into contact with each other; the mounting may take place using intermediate parts interposed between the two parts to be mounted.

In fact, in the passive configuration, the energy storage device 2 is fixed relative to the chassis 1 and is held and supported by the fixing device 3. In the active configuration, the holding mechanism holds and supports the storage device 2.

The transfer from the passive configuration to the active configuration is advantageously caused by an impact transmitted to the arrangement, for example an impact imposed on an outer surface of the vehicle.

Preferably, the transfer from the passive configuration to the active configuration follows an at least partial breakage of the fixing device 3. The breakage may also be complete, i.e. the fixing device 3 no longer participates at all in supporting and holding the energy storage device 2 on the chassis 1. In other words, in the case of total breakage, only the holding mechanism 4 allows the energy storage device 2 to be held and supported relative to the chassis 1.

Preferably, the transfer from the passive configuration to the active configuration takes place on a falling movement of the energy storage device 2. On FIGS. 1 to 3, the direction of fall is parallel to gravity, illustrated by the arrow G.

In the case of falling of the energy storage device 2, this fall is not sustained for long because the fall travel, oriented in the same direction and parallel to G, may be stopped when the energy storage device 2 comes into contact with a stop, also known as a holding element 5 (FIGS. 2 and 3) of the holding mechanism.

In general, the holding mechanism 4 may comprise a connecting element 6 mounted on the chassis 1, and a holding element 5 mounted on the connecting element 6, said connecting element 6 passing through a cavity 7, for example a through hole, of the energy storage device 2 such that at least part of the energy storage device 2 is arranged between the chassis 1 and the holding element 5.

According to a particular embodiment, the holding element 5 is a washer, in particular of dimensions preventing its passage through the cavity 7. This allows the support of the energy storage device 2 to be maintained irrespective of the position of the washer relative to the cavity 7. An element other than a washer may be used insofar as it performs the function of stopping and capturing the energy storage device 2 before it touches the ground.

Advantageously, the connecting element 6 comprises a plate 8 which is mounted on the chassis 1 (preferably by direct contact with the chassis 1) and from which an elongated body 9 of the connecting element 4 extends, said elongated body 9 passing through the cavity 7 of the energy storage device 2. Preferably, the connecting element 6 and the plate 8 are integral and the holding element 5 is removable.

Advantageously, the holding element 5 is mounted on the elongated body 9 at an end of the elongated body 9 opposite the plate 8, in particular by a bolt 10 screwed into the elongated body 9 and forcing the holding element 5 against said elongated body 9. It is understood that here the bolt is merely one exemplary embodiment, it may be replaced by any other element allowing fixing of the holding element 5 to the elongated body 9.

On the particular example of FIG. 3, the elongation of the elongated body 9 is substantially parallel to the direction G.

Advantageously, the energy storage device 2 comprises a propulsion battery for a motor vehicle, and preferably a battery support on which the battery is mounted. The support may be pierced to delimit the cavity 7 and be passed through by the connecting element 6, in particular the elongated body 9 of the connecting element.

The term "propulsion" should be understood in the widest sense of its definition, to mean causing a movement of the vehicle. Thus the propulsion battery may supply current to an electric motor configured to drive the vehicle by rear and/or front wheel drive.

Figure 4:
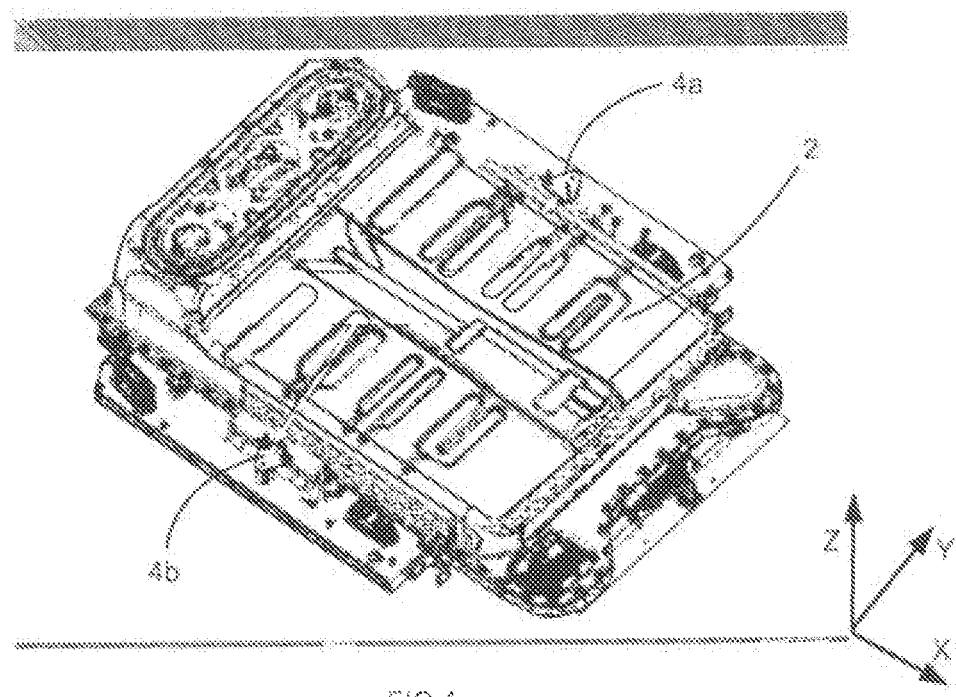
FIG. 4 illustrates a perspective view of an energy storage device held by two holding mechanisms according to the example of FIG. 1.

Preferably, as illustrated in FIG. 4, the arrangement comprises at least two holding mechanisms 4a, 4b. These two holding mechanisms 4a, 4b are preferably mounted on two opposite sides of the energy storage device. In other words, the device may comprise at least two connecting elements, each passing through the energy storage device 2 and each associated with a corresponding holding device. Naturally the number of holding mechanisms is adapted depending on the form, weight or other characteristics of the energy storage device.

Advantageously, breakage of at least part of the fixing device 3 occurs during a frontal, rear or lateral impact imposed on the vehicle, in particular by shearing of one (or more) fixing element(s) of the fixing device 3.

In fact, in general, it must be understood that the fixing device 3 comprises a plurality of elements for fixing to the chassis 1. In the case of a major impact, one or more of these elements—or all of them—may fail under a shear force transmitted by the impact between the chassis 1 and the energy storage device 2. The holding mechanism therefore acts to assist in the support and holding of the energy storage device 2 after it has fallen in direction G.

Preferably, in the passive configuration, the holding mechanism 4 is not in direct physical contact with the energy storage device 2. Then, in the case of impact, this would not lead to breakage of the connection of the holding mechanism 4 with the chassis 1. In fact it is considered that the energy of the impact would be sufficiently dissipated before the holding mechanism comes into physical contact with the energy storage device, thus avoiding any risk of breakage of the holding mechanism 4.

A motor vehicle may comprise an arrangement as described above.

The arrangement is preferably disposed in the vehicle according to a reference system X, Y, Z of the vehicle as oriented in FIGS. 3 and 4, where axis X represents the longitudinal axis of the vehicle passing through the front and rear of the vehicle, axis Z is a vertical axis of the vehicle oriented upward when the wheels of the vehicle are resting on the ground, and axis Y is the transverse axis of the vehicle substantially perpendicular to X and Z while being substantially horizontal. A lateral impact is then substantially parallel to axis Y whereas a frontal or rear impact is substantially parallel to axis X.

Preferably, the energy storage device 2 is arranged so as to be accessible from the outside and the underside of the vehicle. The underside of the vehicle is defined by a face of the vehicle facing the ground when the vehicle is resting on the ground by its wheels.

In the particular example with the holding element 5, it is possible to exchange the energy storage device by withdrawing each holding element 5. This allows for example changing of the energy storage device 2 in a service station.

The invention claimed is:

1. An arrangement for a motor vehicle comprising:
   a chassis;
   an electrical energy storage device;
   a device for fixing the energy storage device to the chassis of the vehicle; and
   a holding mechanism configured to transfer, in a case of breakage of at least part of the fixing device, from a passive configuration in which the holding mechanism does not support the energy storage device and is not in direct contact with the energy storage device, to an active configuration in which the holding mechanism supports the energy storage device and is in direct contact with the energy storage device to hold the energy storage device close to the chassis.

2. The arrangement as claimed in claim 1, wherein the transfer from the passive configuration to the active configuration takes place on a falling movement of the energy storage device.

3. The arrangement as claimed in claim 1, wherein the holding mechanism comprises a connecting element mounted on the chassis, and a holding element mounted on the connecting element, the connecting element passing through a cavity, or a through hole, of the energy storage device such that at least part of the energy storage device is arranged between the chassis and the holding element.

4. The arrangement as claimed in claim 3, wherein the holding element is a washer, with dimensions preventing passage of the washer through the cavity.

5. The arrangement as claimed in claim 3, wherein the connecting element comprises a plate which is mounted on the chassis and from which an elongated body of the connecting element extends, the elongated body passing through the cavity of the energy storage device.

6. The arrangement as claimed in claim 5, wherein the holding element is mounted on the elongated body at an end opposite the plate, or by a bolt screwed into the elongated body and forcing the holding element against the elongated body.

7. The arrangement as claimed in claim 1, wherein the energy storage device comprises a propulsion battery for the motor vehicle.

8. The arrangement as claimed in claim 1, comprising two holding mechanisms.

9. The arrangement as claimed in claim 1, wherein the breakage of at least part of the fixing device occurs during a frontal, rear or lateral impact imposed on the vehicle, or by shearing of a fixing element of the fixing device.

10. A motor vehicle, comprising an arrangement according to claim 1.

11. The motor vehicle as claimed in claim 10, wherein the arrangement is configured such that the energy storage device is accessible from an outside and an underside of the vehicle.

12. An arrangement for a motor vehicle comprising:
 a chassis;
 an electrical energy storage device;
 a device for fixing the energy storage device to the chassis of the vehicle; and
 a holding mechanism configured to transfer, in a case of breakage of at least part of the fixing device, from a passive configuration in which the holding mechanism does not support the energy storage device, to an active configuration in which the holding mechanism supports the energy storage device to hold the energy storage device close to the chassis,
 wherein the holding mechanism comprises a connecting element mounted on the chassis, and a holding element mounted on the connecting element, the connecting element passing through a cavity, or a through hole, of the energy storage device such that at least part of the energy storage device is arranged between the chassis and the holding element.

13. The arrangement as claimed in claim 12, wherein the holding element is a washer, with dimensions preventing passage of the washer through the cavity.

14. The arrangement as claimed in claim 12, wherein the connecting element comprises a plate which is mounted on the chassis and from which an elongated body of the connecting element extends, the elongated body passing through the cavity of the energy storage device.

15. The arrangement as claimed in claim 14, wherein the holding element is mounted on the elongated body at an end opposite the plate, or by a bolt screwed into the elongated body and forcing the holding element against the elongated body.

16. The arrangement as claimed in claim 12, wherein the transfer from the passive configuration to the active configuration takes place on a falling movement of the energy storage device.

17. The arrangement as claimed in claim 12, wherein the energy storage device comprises a propulsion battery for the motor vehicle.

18. The arrangement as claimed in claim 12, comprising two holding mechanisms.

19. The arrangement as claimed in claim 12, wherein the breakage of at least part of the fixing device occurs during a frontal, rear or lateral impact imposed on the vehicle, or by shearing of a fixing element of the fixing device.

20. A motor vehicle, comprising an arrangement according to claim 12.

* * * * *